2,963,490
Patented Dec. 6, 1960

2,963,490

EPOXYHEXAHYDROPHTHALATES AND ENDO-ALKYLENE-EPOXYHEXAHYDROPHTHALATES

Stanley P. Rowland, Cincinnati, Ohio, and Ellington M. Beavers, Elkins Park, Pa., assignors to Rohm & Haas Company, Philadelphia, Pa., a corporation of Delaware No Drawing. Filed Nov. 23, 1956, Ser. No. 623,819

7 Claims. (Cl. 260—348)

This invention relates to unsubstituted 4,5-epoxyhexahydro-1,2-phthalates, alkyl and/or halo-4,5-epoxyhexahydro-1,2-phthalates substituted in the 3,4,5, or 6-positions of the hexane ring, and corresponding identically substituted or unsubstituted bridged compounds, the process whereby such compounds are prepared, and new compositions of matter containing such compounds. For purposes of this invention, unless specified otherwise, the term 4,5-epoxyhexahydro-1,2-phthalates also includes compounds substituted in some or all of the 3,4,5, and/or 6-positions of the hexane ring as well as the respective 3,6-bridged compounds unsubstituted or identically substituted in some or all of the 3,4,5, or 6-positions of the cyclohexane group. Moreover, since the present invention is concerned with the 1,2-substituted hexahydrophthalates the term 4,5-epoxyhexahydrophthalate herein designates only the compounds in which the carboxyl ester groups are substituted in the 1,2-positions.

As will be discussed in detail hereinafter, this new group of 4,5-epoxyhexahydrophthalates includes distinct classes which, although being substantially equivalent as plasticizers and stabilizers, show differences one from the other in chemical structure, nature, position, and number of substituents on the cyclohexane group.

These 4,5-epoxyhexahydrophthalates have been found to be outstanding modifiers, plasticizers, and stabilizers for halogen-containing synthetic resins. The 4,5-epoxyhexahydrophthalates may be represented by the general formula:

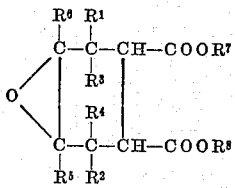

wherein $R^1$, $R^2$, $R^5$, and $R^6$, which may be alike or different, are hydrogen or lower alkyl radicals containing from 1 to 4 carbon atoms, preferably methyl, or a halogen radical, preferably chlorine, $R^3$ when not directly bonded to $R^4$ is hydrogen or a lower alkyl radical containing from 1 to 4 carbon atoms, preferably a methyl radical, or a halogen radical, preferably chlorine, and $R^4$ when not directly bonded to $R^3$ is hydrogen or a lower alkyl radical containing from 1 to 4 carbon atoms, preferably a methyl radical, or a halogen radical, preferably chlorine. $R^3$ and $R^4$ may be alike or different. When $R^3$ and $R^4$ are directly bonded to each other, they form a 1 to 2 carbon atom-containing, preferably a one carbon atom-containing, methylene or ethylene bridge to each carbon of which there may be bonded at least one alkyl radical containing from 1 to 4 carbon atoms, preferably a methyl radical, or a halogen radical, preferably a chlorine radical, $R^7$ and $R^8$, which may be the same or different groups are alkyl radicals containing not ness than 6 carbon atoms, and preferably not more than 18 carbon atoms. Within these limitations $R^7$ and $R^8$ may be straight or branched alkyl radicals in any spatial configuration and it is preferred that each radical contain from 8 to 12 carbon atoms.

Thus, $R^7$ and $R^8$ are the alkyl residues of the corresponding saturated monohydric alcohols, for example, hexanol, heptanol, octanol, nonanol, decanol, undecanol, dodecanol, tridecanol, tetradecanol, hexadecanol, octadecanol, 2-ethylbutanol, 2-methylpentanol, 2-methylhexanol, 2-ethylhexanol, 7-methyloctanol, 2,6-dimethyl-4-heptanol, 3,3,5-trimethylhexanol, 3-isopropyl-5-methylhexanol, 3,7-dimethyloctanol, 9-methylnonanol, 15-ethylhexadecanol, and the like.

As typical representations of $R^1$, $R^2$, and of $R^3$ and $R^4$ when not directly bonded to each other, there may be employed a hydrogen atom, a methyl, ethyl, propyl, isopropyl, butyl, tertbutyl or isobutyl group. Amongst these methyl is preferred because of ease of preparation of the compounds and, for the same reason, the hydrogen atom is preferred over methyl.

Typical representations for $R^5$ and $R^6$ are identical with those for $R^1$, $R^2$, $R^3$, and $R^4$ given above. Although amongst these representations for $R^5$ and $R^6$ the methyl radical is still preferred over other alkyl radicals because of ease of preparation, the methyl radical is also preferred over hydrogen in certain applications to which the compound is put. This is because it has been found that among the new group of 4,5-epoxyhexahydrophthalates there is a special class of compounds represented by those in which $R^5$ or $R^6$, or both, are alkyl, especially methyl. These particular compounds not only excel as plasticizers but also are unusually efficient stabilizers in certain polymers which may decompose with the liberation of acidic materials under higher temperatures and over long periods of time. This quality appears to be due to the spatial configuration assumed even if only one $R^5$ or $R^6$ group is alkyl.

The radicals $R^1$, $R^2$, $R^5$, $R^6$, and $R^3$ and $R^4$, when not directly bonded to each other, may also represent a halogen atom and, preferably, chlorine. As between the halogen atoms on one hand and the group consisting of alkyl radicals and hydrogen atoms on the other, it is preferred that $R^1$, $R^2$, $R^3$, $R^4$, $R^5$, and $R^6$ represent the latter group. Because it is somewhat easier to epoxidize the 4,5-alkyl substituted cylic esters than the 4,5-halo substituted ones, the former esters are preferred. Thus, $R^1$, $R^2$, $R^3$, $R^4$, $R^5$, and $R^6$ may represent a mixture of halo or hydrogen atoms or the methyl radical. More often, because of ease of preparation and excellency of performance as plasticizing stabilizers, the substituents are methyl or hydrogen with predominance of the latter and methyl groups vicinal to the epoxy oxygen.

When $R^3$ and $R^4$ are directly bonded to each other forming a saturated aliphatic divalent bridge between the 3 and 6-carbon atom of the cyclohexane group, there is formed the class of 4,5-epoxyhexahydrophthalates of the endo-type which is of special interest due to its excellent stability. The alkylene bridge may be represented by the general formula:

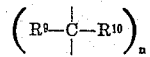

where $n$ is an integer from 1 to 2, inclusive, preferably 1, and $R^9$ and $R^{10}$, which may be the same or different, are a hydrogen atom or a lower alkyl group, preferably a methyl group, or a halogen atom, preferably chlorine, the methyl group being preferred over chlorine. It is also preferred that at least one hydrogen atom be directly bonded to each carbon atom of the saturated aliphatic divalent bridge.

Typical representations of bridging groups are chloromethylene, methylmethylene, dimethylmethylene, methylene, ethylene, 7''-methylethylene, 7'',8''-dimethylene, 7''-chloroethylene, 8''-bromoethylene, and the like. When the bridge is ethylene, the nomenclature used in the instant invention is to designate by 7''- the carbon atom bonded onto the 6-carbon of the cyclohexane ring and by 8''- the carbon bonded directly onto the 7''-carbon and to continue naming similarly as the bridge is lengthened. This distinguishes the substituents on the bridge in the endo-type compound from the alkyl substituents in the alcohol moiety of the ester.

For instance, 2-ethylhexyl 8-methylnonyl 4,5-epoxy-4-methyl-endo-8''-methylethylenehexahydrophthalate may also be named: 1-(2-ethylhexoxycarbonyl)-2-(8-methylnonoxycarbonyl) - 4,5 - epoxy - 4,8 - dimethyl - bicyclo-[2.2.2]octane. Its structure is represented as follows:

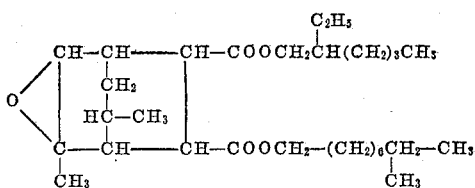

This compound is a very effective plasticizer and stabilizer in halogen-containing vinyl resins and it is formed by epoxidizing 1-(2-ethylhexoxycarbonyl)-2-(8-methylnonoxycarbonyl) - 4,8 - dimethyl-bicyclo[2.2.2]oct-4-ene also named herein 2-ethylhexyl 8-methylnonyl 4-methyl-endo-8''-methylethylenetetrahydrophthalate.

Below are given illustrative examples of new compounds within the scope of this invention:

dihexyl 4,5-epoxyhexahydrophthalate,
di(2-methylpentyl) 4,5-epoxyhexahydrophthalate,
di(2-methylhexyl) 4,5-epoxyhexahydrophthalate,
di(7-methyloctyl) 4,5-epoxyhexahydrophthalate,
di(8-methylnonyl) 4,5-epoxyhexahydrophthalate,
di(3,7-dimethyloctyl) 4,5-epoxyhexahydrophthalate,
di(2-methyloctyl) 4,5-epoxyhexahydrophthalate,
di(3-ethyldecyl) 4,5-epoxyhexahydrophthalate,
di(3,4-dimethyldecyl) 4,5-epoxyhexahydrophthalate,
di(2,3-diethyloctyl) 4,5-epoxyhexahydrophthalate,
didodecyl 4,5-epoxyhexahydrophthalate,
di(2-methyldodecyl) 4,5-epoxyhexahydrophthalate,
ditetradecyl 4,5-epoxyhexahydrophthalate,
dihexadecyl 4,5-epoxyhexahydrophthalate,
dioctadecyl 4,5-epoxyhexahydrophthalate,
di(2-methyltetradecyl) 4,5-epoxyhexahydrophthalate,
di(8 - methylnonyl) 4,5-epoxy-3-methylhexahydrophthalate,
di(8 - methylnonyl) 4,5-epoxy-3,6-dimethylhexahydrophthalate,
di(8-methylnonyl) 4,5-epoxy-3-chlorohexahydrophthalate,
di(8 - methylnonyl) 4,5-epoxy-4-methylhexahydroprophthalate,
dodecyl tetradecyl 4,5-epoxy-3-methylhexahydrophthalate,
dodecyl tetradecyl 4,5-epoxy-3,6-dimethylhexahydrophthalate,
dodecyl tetradecyl 4,5-epoxy-3-chlorohexahydrophthalate,
tetradecyl hexadecyl 4,5-epoxy-3-methylhexahydrophthalate,
tetradecyl hexadecyl 4,5-epoxyhexahydrophthalate,
decyl dodecyl 4,5-epoxyhexahydrophthalate,
hexyl dodecyl 4,5-epoxyhexahydrophthalate,
dioctadecyl 4,5-epoxy-4-methylhexahydrophthalate,
decyl octyl 4,5-epoxyhexahydrophthalate,
decyl octyl 4,5-epoxy-4-methylhexahydrophthalate,
decyl (5-ethylhexyl) 4,5-epoxy-4-methylhexahydrophthalate,
hexyl octyl 4,5-epoxyhexahydrophthalate,
octyl (2-ethylhexyl) 4,5-epoxyhexahydrophthalate,
octyl (7-methyloctyl) 4,5-epoxyhexahydrophthalate,
dodecyl tetradecyl 4,5-epoxyhexahydrophthalate,
dodecyl pentadecyl 4,5-epoxyhexahydrophthalate,
pentadecyl heptadecyl 4,5-epoxyhydrophthalate,
octadecyl hexadecyl 4,5-epoxyhexahydrophthalate,
di(2 - ethylhexyl) 4,5-epoxy-4-methylhexahydrophthalate,
di(hexyl) 4,5-epoxy-4-methylhexahydrophthalate,
di(hexyl) 4,5-epoxy-4,5-dimethylhexahydrophthalate,
di(2 - ethylhexyl) 4,5-epoxy-3-methylhexahydrophthalate,
di(2-ethylhexyl) 4,5-epoxy-3,6-dimethylhexahydrophthalate,
di(2-ethylhexyl) 4,5-epoxy-3-chlorohexahydrophthalate,
di(2-ethylhexyl) 4,5-epoxy-3,4-dimethylhexahydrophthalate,
di(2-ethylhexyl) 4,5-epoxy-3,4,5,6-tetramethylhexahydrophthalate,
di(2 - ethylhexyl) 4,5 - epoxy-4-methyl-5-chlorohexahydrophthalate,
dihexyl 4,5-epoxy-4,7''-dimethyl-3,6-endomethylenehexahydrophthalate,
didecyl 4,5-epoxy-3,6-endomethylenehexahydrophthalate,
didecyl 4,5 - epoxy - 4 - methyl-3,6-endomethylenehexahydrophthalate,
di(8-methylnonyl) 4,5-epoxy-3,6-endomethylenehexahydrophthalate,
dihexyl 4,5 - epoxy-3-methyl-3,6-endomethylenehexahydrophthalate,
dodecyl tetradecyl 4,5-epoxy-3-methyl-3,6-endomethylenehexahydrophthalate,
di(8 - methylnonyl) 4,5-epoxy-4-methyl-3,6-endomethylenehexahydrophthalate,
di(8 - methylnonyl) 4,5 - epoxy - 4,5 - dimethyl-3,6-endomethylenehexahydrophthalate,
di(8-methylnonyl) 4,5-epoxy-4,8''-dimethyl-3,6-endoethylenehexahydrophthalate,
di(8 - methylnonyl) 4,5 - epoxy-4-chloro-8''-methyl-3,6-endoethylenehexahydrophthalate,
dioctadecyl 4,5-epoxy-4-methyl-3,6-endomethylenehexahydrophthalate,
and
dihexadecyl 4,5-epoxy-3,6-endomethylenehexahydrophthalate.

Such compounds comprise a new group of plasticizing stabilizers. They may be used for incorporation into the plastic compositions herein described. They are formed by an in situ epoxidation process whereby there can be prepared the 4,5-epoxyhexahydrophthalates defined above, as well as 4,5-epoxyhexahydrophthalates having either or both $R^7$ and $R^8$ radicals that contain less than 6 carbon atoms. This in situ epoxidation comprises bringing together at a reacting temperature between about 10° C. and the boiling point of the aqueous reaction mixture, a compound of the formula:

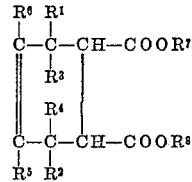

where $R^1$, $R^2$, $R^3$, $R^4$, $R^5$, and $R^6$ have the significance stated above, $R^7$ and $R^8$, which are the same or different, are alkyl radicals containing from 1 to 18 carbon atoms which may be straight or branched or in any spatial configuration, with an aqueous mixture having a pH from about 2.0 to about −1.5, said aqueous mixture comprising at least 1 mole of hydrogen peroxide per mole of starting ester, an aliphatic monocarboxylic acid selected from the group consisting of formic and acetic acid or acetic anhydride, and an auxiliary acidic agent.

Various epoxidation methods are known in the art. Some, such as the reaction of hypochlorous acid followed by dehydrochlorination with alcoholic sodium hydroxide, are cumbersome and of limited application. Other methods are two-step epoxidations using a peracid, such as performic or peracetic acid, which has been previously prepared in a separate operation. However, such conventional two-step epoxidation methods are very dangerous. More recently in situ epoxidation methods, which avoid the highly hazardous storage and handling of the peracids, have been suggested particularly for open-chain, unsubstituted, olefinically unsaturated esters of the higher fatty acids occurring in natural vegetable oils. It has now been found that, under the specific conditions described hereinafter, an in situ epoxidation can be employed to efficiently synthesize the compounds of the formula:

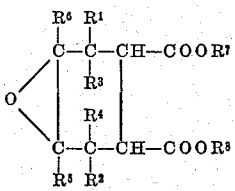

where the R radicals have been defined above, $R^7$ and $R^8$ also including radicals of 1 to 6 carbon atoms, such as ethyl, propyl, butyl, hexyl and the isomers thereof.

In view of the inability of processes heretofore proposed to effectively epoxidize the conventional lower alkyl esters of tetrahydrophthalic acid, it is surprising that one is able to epoxidize most effectively all of the unsaturated tetrahydrophthalates described above. The method here disclosed is so gentle and smooth, yet so effective, that, notwithstanding the relative distortion and strain of these unsaturated ring compounds as compared with the common aliphatic esters of fatty acids, there can be successfully obtained 4,5-epoxyhexahydrophthalates in practically quantitative yields and with practically no formoxy or acetoxy substituents.

The monounsaturated cycloaliphatic esters which are used as starting materials in preparing the epoxy compounds defined above are known and may be prepared by subjecting selected cyclic monounsaturated dicarboxylic acids or anhydride to conventional esterification procedures by reacting the acid or the anhydride with at least one aliphatic monohydric alcohol in the presence of a catalyst or condensing agent, such as sulfuric acid.

The selected cyclic monounsaturated dicarboxylic acids or the corresponding anhydrides are also known and may be synthesized by a Diels-Alder addition reaction. Typical reactions are reported in the literature as, for instance, in "Organic Reactions," vol. IV (John Wiley and Sons, Inc.), on pages 1–60, by Milton C. Kloetzel and H. L. Holmes; Diels and Alder, Ann., 460, 98 (1928); and Farmer and Warren, J. Am. Chem. Soc., 3221 (1931). Such methods and similar other methods which are known may readily be applied to prepare the unsaturated cyclic dicarboxylic acids or anhydrides that are esterified to prepare the starting compounds for this invention. The following list will illustrate the wide variety of reactants which may be used with maleic anhydride as the dienophile to yield the cyclic monounsaturated dicarboxylic acids or anhydrides which are, in turn, esterified to give the esters that are epoxidized according to the manner described below. Acyclic or alicyclic dienes may be employed with the dienophile yielding nonbridged and bridged compounds, respectively. Illustrative dienes include: butadiene, isoprene, (2-methyl-1,3-butadiene), chloroprene, (2-chloro-1,3-butadiene), bromoprene, (2-bromo-1,3-butadiene), 2,3-dimethylbutadiene, 1,3-pentadiene, 2,4-hexadiene, 2-methyl-1,3-pentadiene, 3,5-dimethyl-1,3-pentadiene, 1,3-cyclopentadiene, 2-methyl-1,3-cyclopentadiene, 1,3-cyclohexadiene, 1,3,5,5-tetramethyl-1,3-cyclohexadiene, 1,3-dimethyl-1,3-cyclohexadiene, and similar others.

As may readily be seen from the above list, alkyl and halogen radicals may be introduced into the nucleus of the unsaturated ester and, consequently, into the final epoxidized product merely by judicious selection of a suitable starting diene. It is also important to note that the ease or difficulty with which a compound is prepared by a Diels-Alder addition reaction is not related to the ease of epoxidation of the compound. The instant epoxidation method is applicable with practical success to all of the compounds that come within the generic formula given above regardless of their availability or ease of preparation. Of course, it is preferred to select those starting materials which are reasonable in cost, or commercially available, or those that lend themselves to more convenient synthesis. At the present time such adducts as tetrahydrophthalic anhydride, 3,6-endo-methylenetetrahydrophthalic anhydride, 4-methyltetrahydrophthalic anhydride, 3,6-endo-methylenetetrahydrophthalic anhydride, which are formed by the reaction of maleic anhydride with butadiene, cyclopentadiene, isoprene, and 2-methyl-1,3-cyclopentadiene, respectively, are preferred.

The esterified monounsaturated tetrahydrophthalic adduct defined above is epoxidized over a wide range of temperature which may vary from about 10° C. to about the boiling point of the aqueous mixture. In commercial operations it is preferred to operate from about 50° C. to about 80° C.

The tetrahydrophthalate starting ester is reacted with an aqueous mixture containing hydrogen peroxide. The amount of hydrogen peroxide which is employed should be at least 1 mole for each mole of starting ester. This minimum amount of hydrogen peroxide is required because the peroxide is the ultimate source of the oxygen atom which forms the three-membered epoxide group or oxirane ring with the 2 carbon atoms joined by the original double bond in the 4,5-position of the ring. Ordinarily, an excess of hydrogen peroxide is used to facilitate the reaction. An excess of about 0.1 mole is usually adequate but the excess may be as much as about 1 mole, thus, making the amount of hydrogen peroxide recommended from about 1 to 2 moles per mole of monounsaturated cyclic ester. Commercial grades of hydrogen peroxide containing 35% to 90% peroxide are used, although it is much preferred to use the grades which contain at least 50% hydrogen peroxide. The more concentrated solutions of hydrogen peroxide are used at the lower temperatures and/or with lower ratios of formic acid or of the acetic compound while the more dilute solutions are employed at the higher temperatures in conjunction with the larger ratios of formic acid or of the acetic acid or anhydride.

The aliphatic monocarboxylic acids and anhydride which also are used as part of the aqueous mixture are formic or acetic and acetic anhydride. Ordinarily epoxidations with these acids, particularly when used with an auxiliary acid, are operative only under quite distinct conditions. It is, therefore, somewhat unexpected that in this case either acid may be used. The equivalent success obtained with either acid appears to be due to the somewhat unusual nature of the starting and resulting monounsaturated cyclic compounds and also seems to be strictly limited thereto. The amount of monocarboxylic acid or acetic anhydride which is used is within the range of 0.05 to 1 mole of the acid for each mole of the unsaturated cyclic ester. For the purpose of this invention, one mole of acetic anhydride is equivalent to 2 moles of acetic acid. Usually it is preferred to employ from about 0.1 to 0.5 mole of acid since in that range very efficient epoxidation is obtained under economical conditions. Either acid may be used alone or they may be mixed; but the concentrations must be carefully observed to achieve effective epoxidation since it is the peracid which apparently enters the organic phase and is responsible for the epoxidation of the double bond in the acid moiety of the ester.

The aqueous mixtures of hydrogen peroxide and acetic anhydride, acetic acid or formic acid which are employed have a pH of about +2.0 to −1.5 by virtue of containing, in addition to the monocarboxylic acid or anhydride, an auxiliary promoting ionizable acidic agent. The following are typical acidic materials which may be used successfully and advantageously: inorganic acids such as phosphoric, sulfuric, hydrochloric, nitric, and boric acids; acid-forming salts such as sodium acid sulfate, potassium acid sulfate, potassium persulfate and zinc chloride; organic sulfonic acids such as toluene sulfonic and methane sulfonic acids; strong carboxylic acids such as maleic, fumaric and oxalic acids; and acidic esters such as ethyl di-acid phosphate, isopropyl di-acid phosphate, mono- and di-methyl sulfate. In this process, an auxiliary acidic promoting agent is always used in conjunction with the formic acid, acetic acid, or anhydride, and the agent is used in the lowest amount which is commensurate with a fast rate of epoxidation and which is sufficient to bring the pH of any particular reaction mixture within the desired range above indicated. A very convenient way is to add formic or acetic acid or acetic anhydride in an amount from 0.02 to 2 moles and then add thereto a particular auxiliary acidic agent until the pH comes within the +2.0 to −1.5 range.

The auxiliary acidic agent must ionize in the aqueous medium so that, together with the acetic acid, it provides a pH within the range of +2.0 to −1.5. It is also preferable that the auxiliary acidic agent have little, if any, solubility in the organic ester phase, i.e., that it be essentially insoluble in the ester being epoxidized. Therefore, the inorganic acidic agents are recommended over the organic acidic materials. This is because organic acidic agents, such as maleic acid or oxalic acid, which are more soluble than inorganic compounds in the organic phase, tend to react with the epoxy compounds and to convert them to hydroxy and/or acyloxy derivatives, which, in view of the objects of this invention, are undesirable. The epoxidation of the ester starts almost immediately on contact of the ester with the aqueous solution. Then the reaction progresses rapidly and smoothly. It does not become dangerously exothermic at any time. Not only are the smoothness, safety and efficiency of the reaction increased by the use of the auxiliary acidic agent which imparts a pH of +2.0 to −1.5 to the solution of hydrogen peroxide and formic acid, acetic acid, or acetic anhydride, but the product contains a high ratio of oxirane oxygen, a low amount of residual unsaturation, and a minimum amount of hydroxy and/or acyloxy substituents. Thus by the use of the auxiliary acidic agent, the efficiency of the entire operation of producing epoxidized esters is increased.

In the process of this invention it is preferred that the auxiliary acidic agent first be added to the ester, followed by the hydrogen peroxide, formic acid, acetic acid, or acetic anhydride simultaneously and at such a rate that the temperature can be held within the desired range. Alternatively the reactants can be added portion-wise in the proper ratios so that the pH of the aqueous phase is within the limits of +2.0 to −1.5. A very satisfactory method—particularly where larger amounts of esters are involved—is to add the reactants to the ester in about five equal portions at intervals of about 30 minutes. Reactivity is usually manifested by a rise in temperature of the reaction mixture; and external heating may be reduced or discontinued since the exothermic nature of the reaction is ordinarily sufficient to maintain the desired temperature once it is attained. In the case of the more reactive esters, it is sometimes necessary to employ conventional cooling means. It is inadvisable to pre-mix the hydrogen peroxide and the formic acid, acetic anhydride, or acetic acid. After all of the reactants have been added, the reaction mixture is stirred at the elevated temperature until epoxidation is essentially complete. A period of about eight hours is usually adequate at temperatures within the range of 50° C. to 80° C. The cooled reaction mixture is next separated into an aqueous phase and an organic phase, the latter being the epoxidized ester. The rate of separation is greatly increased by the presence of a water-immiscible liquid which is a solvent for the epoxidized ester. An organic liquid, such as toluene, is good for this purpose. The separated organic phase is washed thoroughly with a neutralizing solution such as a solution of sodium bicarbonate and water, and is then stripped by distillation of any organic liquid which may have been used.

Substantially the same rapid rate of reaction is realized when the peroxidic mixture is added slowly and continuously over approximately the same length of time as is required to add aliquot portions. Furthermore, essentially the same results are obtained when the hydrogen peroxide, formic acid, acetic acid, or acetic anhydride and acidic agent are added individually and simultaneously or when the acidic agent is mixed with either the peroxide or the formic acid, acetic acid, or anhydride.

What is essential to the success is that there be brought together at a reacting temperature a specific mono-unsaturated cyclic ester as defined above and an aqueous mixture comprising an aliphatic monocarboxylic acid containing 1 or 2 carbon atoms, or acetic anhydride, water and hydrogen peroxide, and that said aqueous mixture have a pH from about +2.0 to about −1.5 by virtue of the addition of an auxiliary acidic agent, the water present being about 1% to about 90% of the mixture.

The degree of unsaturation of the starting ester or technical product containing it is known or may be readily determined by standard methods, such as the determination of the bromine or iodine number.

The pH values mentioned herein are those determined at 25° C. A very convenient method for determining negative pH values without the use of indicators, and which was adopted in the development of the instant invention, is carried out as follows: With a standard buffer having a real pH of 2.0 a Beckman pH Meter (e.g. Model H-2 with 4990-83 glass electrode and 4970 reference electrode) is adjusted to read a pH of 5.0. The pH meter, thus adjusted to a "negative three scale," is used in the customary way and the values read therefrom are corrected by the addition of the value—3.0. Further determinations of negative pH values are found in J. Am. Chem. Soc., 64, 1861 (1942), by Michaelis and Granick; and V. M. Clark, "The Determination of Hydrogen Ions" (Williams and Wilkins Co., Baltimore, Md., 3rd edition (1928)).

The following examples serve to illustrate the preparation of typical 4,5-epoxyhexahydrophthalates and are in no way to be construed as limiting the invention in spirit or in scope. All quantities are in parts by weight; viscosity values are on the Gardner-Holdt scale.

EXAMPLE 1

*Di(2-ethylhexyl) 4,5-epoxyhexahaydrophthalate*

A. Into a reactor equipped with a stirrer, thermometer, reflux condenser, and an addition tube are charged 394 g. of di(2-ethylhexyl) tetrahydrophthalate and 2 g. of phosphoric acid. The solution is mixed and heated to within 50° to 60° C. Over a period of 3.5 hours there is added individually 15.3 grams of 90% formic acid and 63.2 grams of 70% hydrogen peroxide in 5 equal portions of each reactant at intervals of about 30 minutes. The temperature is maintained within the range of 50° to 60° C. After a total reaction time of 8 hours 100 grams of water are added. The aqueous phase, the pH of which is +1.9, is separated and the organic phase is washed with 200 gram-portions of water. The volatile material—chiefly water and toluene—is removed by distillation to 100° C. and 1 mm. pressure. The product has a viscosity of B—, an oxirane-oxygen content of 2.8%, an iodine number of 6.1, and an acid number of 0.28. The product is di(2-ethylhexyl) 4,5-epoxyhexahydrophthalate, a new plasticizing stabilizer.

B. In the same manner as set forth above there is used acetic acid or the equivalent amount of the anhydride. The temperature is maintained at 25° to 30° C. A product of equally satisfactory properties is obtained in quantitative yield.

In both part "A" and "B" phosphoric acid is replaced by boric acid as auxiliary acidic agent. The pH is —1.0. Equally good yields are obtained. Similarly, any of the other acidic agents hereinabove referred to may be used with equal success.

Following the same general procedure, the following new plasticizing stabilizers are obtained in excellent yields from the corresponding 4,5-monounsaturated cyclic esters:

dihexyl 4,5-epoxyhexahydrophthalate,
di(3,7-dimethyloctyl) 4,5-epoxyhexahydrophthalate,
dioctadecyl 4,5-epoxyhexahydrophthalate,
ditetradecyl 4,5-epoxyhexahydrophthalate,
dodecyl tetradecyl 4,5-epoxy-3-methylhexahydrophthalate,
tetradecyl hexadecyl, 4,5-epoxy-3-methylhexahydrophalate.
and
decyl dodecyl 4,5-epoxyhexahydrophthalate.

In a similar manner, there are prepared very satisfactorily the other 4,5-epoxyhexahydrophthalates substituted on the ring by halogens, such as di(2-ethylhexyl) 4,5 - epoxy - 5 - chlorohexahydrophthalate. In the cases where the halogen atom is bonded onto the 4 or 5-position carbon of the ring the epoxidation is somewhat slower, while if the substituents are alkyl, such as methyl, like in di(2-ethyloctyl) 4,5-epoxy-4-methylhexahydrophthalate, the epoxidation reaction is even somewhat more efficient.

EXAMPLE 2

Di(8-methylnonyl) 4,5-epoxyhexahydrophthalate

A. One mole of di(8-methylnonyl) tetrahydrophthalate is mixed in a reaction vessel with 1.5 moles of 90% hydrogen peroxide, 0.5 mole of glacial acetic acid, and 0.05 mole of phosphoric acid. The temperature is maintained between 50° to 80° C. during the reaction. After about 4 hours water is added and the aqueous phase is separated. The pH of the aqueous phase during the preparation is between —1.0 and +1.0. The organic phase is treated by adding toluene, washing 4 times with hot water, and stripping to 125° C. at 1 mm. pressure. The product, which is di(8-methylnonyl) 4,5-epoxyhexahyrdophthalate, has a viscosity of E—, an oxirane-oxygen content of 3.12%, an iodine number of 3.5, and an acid number of 0.11. This new cyclic epoxy ester is an excellent stabilizing plasticizer.

B. Following the same general procedure of "A" there is used 0.25 mole of acetic anhydride or 0.055 mole of 90% formic acid yielding in excellent yields di(8-methylnonyl) 4,5-epoxyhexahydrophthalate. Similarly, when phosphoric acid is replaced by sulfuric, hydrochloric, nitric or boric acid, the identical product is formed also in the high yields. The other acidic agents are similarly effective. The pH of the aqueous mixture is always adjusted to within the range of +2.0 to —1.5.

Following substantially the same general method as described above, di(2-methyltetradecyl) 4,5-epoxyhexahydrophthalate, di(8-methylnonyl) 4,5-epoxy-3-methylhexahydrophthalate, di(8-methylnonyl) 4,5-epoxy-3,6-dimethylhexahydrophthalate, and di(8-methylnonyl) 4,5-epoxy-3-chlorohexahydrophthalate are prepared from the corresponding esters. Regardless of the compound used the epoxidized ester is obtained in very good yields.

EXAMPLE 3

Dimethyl 4,5-epoxyhexahydrophthalate is prepared from dimethyl hexahydrophthalate using acetic acid, 0.2 mole, hydrogen peroxide, 1.2 moles, and sulfuric acid to bring the pH to within a range of about +1.0 to —1.0. The yield is very good. Similarly, the diethyl-, dibutyl-, dipropyl-, dipentyl and similar low molecular weight esters are prepared.

EXAMPLE 4

Octyl decyl 4,5-epoxyhexahydrophthalate

This compound is prepared following the same general procedure as in Example 1, reacting the corresponding unsaturated cyclic ester with 0.05 mole of acetic acid, 1.0 mole of 70% hydrogen peroxide, and phosphoric acid. The pH of the aqueous mixture is —1.5 and the temperature is maintained between about 30° to 50° C. Very good yields of octyl decyl 4,5-epoxyhexahydrophthalate are obtained. This is a very effective plasticizing stabilizer in vinyl resins.

Excellent yields of octyl decyl 4,5-epoxyhexahydrophthalate are obtained when, following the same general procedure, formic acid (90%) and sulfuric acid are used with 1.5 moles of hydrogen peroxide. All other auxiliary agents of the type shown above are used with similar success with formic and acetic acids and/or acetic anhydride. Similarly, decyl octyl 4,5-epoxyhexahydrophthalate, decyl octyl 4,5-epoxy-4-methylhexahydrophthalate, and decyl (5-ethylhexyl) 4,5-epoxy-4-methylhexahydrophthalate, and similar others, are prepared in the same manner.

EXAMPLE 5

Didecyl 4,5-epoxy-4-methylhexahydrophthalate

A. In a flask equipped as in Example 1, there is charged 1 mole of didecyl 4-methyltetrahydrophthalate. The liquid is stirred and heated to 30° C. Over a period of 5 hours there are individually added 88.4 grams (1.3 moles) of a 50% aqueous solution of hydrogen peroxide, 16.9 grams of 90% formic acid (0.33 mole) and 3.5 grams of phosphoric acid (0.033 mole) in 5 portions at 30 minutes interval. The aqueous mixture has a pH value of —0.65. After about 8 hours the organic phase is separated, washed with a saturated solution of sodium bicarbonate and then with water, after which it is dried at 100° C., filtered, and analyzed. The product is didecyl 4,5-epoxy-4-methylhydrophthalate, having an oxirane-oxygen content of 2.2%, an iodine number of 1.2, and a viscosity of E—. It is a very effective stabilizing plasticizer, particularly when heat stability is desired.

B. In part "A" formic acid is replaced by acetic acid (0.30 mole); the same product is obtained in essentially the same yield. Other inorganic acids, acid-forming salts, organic sulfonic acids, and other auxiliary acidic agents are used with similar success.

Other 4,5-halo- or 4,5-alkyl substituted 4,5-epoxyhexahydrophthalates are prepared in the same manner using formic acid, acetic acid, or anhydride, or mixtures in amounts from 0.1 to 0.5 mole of acid per mole of ester in conjunction with an auxiliary acidic agent and hydrogen peroxide. For instance, dihexyl 4,5-epoxy-4-methylhexahydrophthalate and dihexyl 4,5-epoxy-4,5-dimethylhexahydrophthalate are obtained from the corresponding esters in comparable yields. The esters alkyl-substituted in the 4 and/or 5 position are epoxidized with particular effectiveness.

EXAMPLE 6

Dodecyl tetradecyl 4,5-epoxyhexahydrophthalate

This new stabilizing plasticizer is prepared from dodecyl tetradecyl tetrahydrophthalate, following the general procedure described above. The product has a viscosity of A+, an oxirane-oxygen content of 2.25%, and acid number of 0.27, and an iodine number of 6.8.

Compounds hexyl octyl 4,5-epoxyhexahydrophthalate, octyl-(2-ethylhexyl) 4,5-epoxyhexahydrophthalate, and octadecyl hexadecyl 4,5-epoxyhexahydrophthalate are similarly prepared.

EXAMPLE 7

*Di(8-methylnonyl) 4,5-epoxy-3,6-endomethylenehexahydrophthalate*

A. Di(8-methylnonyl) 3,6-endomethylenetetrahydrophthalate (one mole) is epoxidized by reacting it with an aqueous mixture having a pH of −0.65 and containing 1.15 grams (0.01 mole) of 85% phosphoric acid, 9.8 grams (0.23 mole) of 90% formic acid, and 88.6 grams (1.30 mole) of 50% hydrogen peroxide. The mixture is stirred at 55° to 60° C. for one-half hour, after which nine aliquots of the peroxidic mixture are added at 30 minutes interval, while the temperature is maintained between 55° to 60° C. The final product is di(8-methylnonyl) 4,5-epoxy-3,6-endomethylenehexahydrophthalate. The structure of the product is confirmed by analysis. It has an oxirane-oxygen of 0.2% (theory, 3.35%), hydroxyl number of 5.0 (theory, 235), an iodine number of 1.5, acid number 0.5, saponification number 241 (theory, 235), percent carbon 72.87, percent hydrogen 10.58 (theory, 72.40 and 10.53, respectively). The increase in molecular weight due to epoxidation is found to be 13 (theory, 16). The low values found for oxirane oxygen and for saponification number clearly show the unusual stability of the endo-type compounds.

B. Acetic acid (0.5 mole) and 1.5 mole of 50% hydrogen peroxide are employed in the same manner. The pH is adjusted to 1.5 with boric acid; the temperature is between 50° to 80° C. The same final product as in part "A" is obtained in most satisfying yields.

Other auxiliary acids are used with comparable success to epoxidize other members of the endo-type compounds. For instance, from the corresponding unsaturated cyclic ester there is obtained:

dihexyl 4,5-epoxy-4,7''-dimethyl-3,6-endomethylenehexahydrophthalate,
didecyl 4,5-epoxy-4-methyl-3,6-endomethylenehexahydrophthalate,
diehexyl 4,5-epoxy-3-methyl-3,6-endomethylenehexahydrophthalate,
dodecyl tetradecyl 4,5-epoxy-6-methyl-3,6-endomethylenehexahydrophthalate,
dioctadecyl 4,5-epoxy-4-methyl-3,6-endomethylenehexahydrophthalate,
dihexadecyl 4,5-epoxy-3,6-endomethylenehexahydrophthalate, and
di(8-methylnonyl) 4,5-epoxy-4,8''-dimethyl-3,6-endoethylenehexahydrophthalate in very good yields.

The 4,5-epoxyhexahydrophthalates which we have discovered are useful as hydrophobic agents. Upon incorporation into leather, they impart thereto good and long-lasting water-repellency. In this fashion, leather-made materials can now be employed under varied conditions under which they were of limited value heretofore. Moreover, the 4,5-epoxyhexahydrophthalates are of special interest as additives and stabilizers in hydrocarbon oils for specialized electrical equipment, as in transformer oils in which they apparently effectively sequester contaminating and corroding acids. In this manner, the use and length of service of electrical equipment using such oils can be appreciably lengthened.

Of even greater interest is the use of this new group of 4,5-epoxyhexahydrophthalates not only as plasticizers but also as stabilizers giving new and improved plastic compositions, particularly in conjunction with chlorinated rubber and halogen-containing vinyl resins.

The category of halogen-containing vinyl resins includes the following: polymers of a vinyl halide, such as vinyl chloride and vinyl bromide, copolymers of a vinyl halide and a vinyl ester of a lower aliphatic acid, such as copolymers of vinyl chloride and vinyl acetate or vinyl propionate, copolymers of vinyl halides and vinylidene halides, such as copolymers of vinyl chloride and vinylidene chloride, and copolymers of vinyl chloride and another vinylidene compound, such as ethyl acrylate, methyl methacrylate, and the like.

The new compounds are outstanding when used as stabilizers and plasticizers. They offer an unusual combination of desirable properties by having excellent compatibility and long-term retention of compatibility with chlorovinyl compounds. They exhibit therein markedly low volatility and impart to the new resinous compositions impressive stability upon exposure to heat allied with flexibility at low temperatures, good resistance to extractability by soaps and detergents, as well as uncommon resistance to ultraviolet light decomposition.

Various degrees of improvements are achieved when the concentrations or the blends of the stabilizing plasticizer are varied in the composition. Special effects may be obtained when two or more of the new stabilizing plasticizers are employed in the same stock. When a stabilizing effect is primarily required, as little as 1% of any of the new compounds based on the weight of the plastic material exerts a marked stabilizing effect. In such low concentrations, as for instance from about 1% to 10%, the products of this invention may be used in blends with other conventional plasticizers, such as DOP (di-2-ethylhexyl phthalate) or octyl decyl phthalate.

The 4,5-epoxyhexahydrophthalates having $R^7$ and $R^8$ radicals containing more than 12 carbon atoms are customarily used in concentrations from about 1% to 10%, preferably 1% to 5%, based on the weight of the plastic material since at higher concentrations these compounds tend to be somewhat less compatible in some plastic materials. The other stabilizing plasticizers of this invention are generally employed in concentration above 5%, and preferably above 25%, as 25% to 100%, based on the weight of the plastic material. For the production of flexible sheeting or tubing of excellent stability, from about 40% to 70% of the stabilizing plasticizer based on the weight of the plastic material is recommended. The products of this invention may also be used in conjunction with conventional modifiers for plastic materials, such as pigments, dyes, fillers, release agents, mold lubricants, and the like. The resulting new polyvinyl compositions display even further marked resistance to volatility when there is selected one or more stabilizing plasticizers from the endo-class or from that class of compounds having a methyl substituent vicinal to the epoxy oxygen. The endo-class of compounds appears to be unusually unreactive and stable under various applications and the latter class appears to have particularly low volatility. The resulting new compositions are impressively superior over conventional non-resinous types known heretofore.

Our invention is further disclosed by the following examples in which are set forth, for purpose of illustrating, the performance of the new plasticized and stabilized plastic compositions by incorporating therein the new compounds of this invention. The examples are not to be construed as limiting the invention in spirit or in scope. All quantities of materials, unless specified to the contrary, are in parts by weight.

The plasticizing and stabilizing improvements achieved by the compounds of this invention are usually compared with the effect of dioctyl phthalate (DOP) which is highly regarded in the industry as an effective plasticizer for vinyl resins. Occasionally, the improvements are even further compared with other conventional plasticizers, such as octyl decyl phthalate.

The preparation and formulation of the various ingredients that make up the new plasticized and stabilized plastic compositions is performed according to the following procedure:

The ingredients are blended and then milled on a roller mill, maintained at approximately 160° C. Milling is continued for 5 minutes after the ingredients have fluxed. Sheets of the compositions are always conditioned at 25°

C. and 50% relative humidity for at least 15 hours before any measurements of weight are made. Percent plasticizer loss is in weight based on initial film weight.

The test methods are performed under conditions which apply to a wide variety of problems and can be correlated with normal use conditions.

*Activated carbon volatility.*—Individual specimens of equal thickness are placed between 2″ layers of activated carbon in sealed glass jars which are maintained at 90° C. for 24 hours. The specimens are removed, dusted free of carbon, and re-weighed. The loss in weight is a measure of the amount of plasticizer which has been removed by the carbon.

*Gasoline extraction.*—Weighed samples are immersed in white, lead-free gasoline at 25° C. for 60 minutes, after which they are thoroughly dried and re-weighed. The loss in weight, expressed as the percentage of the original weight, is a measure of the amount of plasticizer which has been extracted by the gasoline.

*Soapy water extraction.*—Weighed specimens are immersed in a 1% aqueous solution of Ivory soap at 60° C. for 24 hours, after which they are thoroughly dried and re-weighed. The loss in weight, expressed as the percentage of the original weight, is a measure of the amount of plasticizer which has been extracted by the soap solution.

*Shore hardness.*—A Shore "A" durometer, under a weight of 3 pounds is applied to the test specimens. A recording is made at once and after 10 seconds; and the hardness is expressed by the two values, of which the first recording is the higher.

*Compatibility.*—Weighed, conditioned duplicate samples, 4 inches by 4 inches by 0.010 inch are placed between two sheets of cardboard, which have been conditioned at least 15 hours. The specimens are in contact with the white, coated side of the cardboard.

The cardboard-specimen sandwiches are placed between 5 inches by 5 inches by 1 inch wood blocks under a 3-kilogram weight.

After seven days, the specimens are removed from the stack, conditioned, and re-weighed. Percent plasticizer loss is calculated. The cardboard sheets are examined qualitatively for evidence of plasticizer or plasticizing stabilizer stains.

*Compatibility - stability (window exposure).*—Film specimens of 0.010 inch thickness are hung, indoors, approximately 6 inches from a transparent window-pane facing northeast. The films are qualitatively evaluated for development of tack, spew, and stiffening at weekly intervals.

*Resistance to degradation by ultraviolet light (fadeometer).*—Samples of film of 0.01 inch thickness are exposed in the Atlas fadeometer. The films are removed at regular intervals, conditioned for one hour at 25° C. and 50 percent relative humidity, and examined for development of tack, spew, stiffening, discoloration, and embrittlement. Failure of a film is indicated when it cracks upon being folded sharply upon itself after the one-hour conditioning period. All films are exposed in standard exposure frames and masks without backing.

*Stability upon exposure to heat.*—Ten samples, 0.5 inch by 0.75 inch, are cut from the 0.07 inch sheet. Each sample is placed on a clean porcelain-coated steel panel. Nine of the sample-laden panels are then set in an oven which has been pre-heated to the desired testing temperature for at least one-half hour. The tenth sample is retained as a control. Samples are removed from the oven after these intervals (hours) of exposure: ¼, ½, ¾, 1, 1½, 2, 3, 4 and 5. All samples with the control, are mounted on a card in the order of increasing exposure.

The stability of a compound under exposure to heat is determined from the temperature and time, in hours, at which a sample displays definite discoloration (becomes dark brown). Stability is indicated by a range of values, the upper limit of which is considered to be the time at which discoloration becomes perceptible and the lower limit the time at which discoloration is severe.

The conventional plasticizers and the new materials of this invention are individually blended in the following formulations according to the procedure described above.

A

| | Parts |
|---|---|
| Polyvinyl chloride (Geon 101) | 60 |
| Plasticizer | 40 |
| Tribasic lead sulfate ("Tribase") | 1 |
| Stearic acid | 0.5 |

B

| | Parts |
|---|---|
| Polyvinyl chloride (Geon) | 60 |
| Plasticizer | 40 |
| Barium-cadmium laurate (Ferro 1820) | 1 |

EXAMPLE A

The superior performance of di(2-ethylhexyl) 4,5-epoxyhexahydrophthalate (diEHepoxyP) over DOP upon formulation according to A or B in resistance to degradation to ultraviolet light and stability upon exposure to heat is shown below.

HEAT TEST

| | DOP | diEHepoxyP | DOP | diEHepoxyP |
|---|---|---|---|---|
| Formulation | A | A | B | B |
| Hours at 350° F | 1½ | >5 | ½ | >5 |
| Hours at 400° F | ½ | 4 | ¼ | >4 |

FADEOMETER EXPOSURE TEST (IN HOURS)

| | DOP | diEHepoxyP | DOP | diEHepoxyP |
|---|---|---|---|---|
| Formulation | A | A | B | B |
| Development of pronounced: | | | | |
| Tack | 171 | 344 | 211 | 509 |
| Stiffening and cracks | 216 | 465 | 325 | 991 |
| Discoloration | 171 | 325 | 325 | >325 |
| Spew | | | 211 | 769 |

Window exposure tests show no serious tack and no spew or stiffening at all in 182 days. This compares very favorably with many other conventional modifiers.

Di(2-ethylhexyl) 4,5-epoxyhexahydrophthalate is incorporated in concentration of about 5% in a copolymer essentially containing about 90% of vinylidene chloride and 10% of vinyl chloride. The stock exhibits good ultraviolet resistance.

Formulations containing mixtures of the di(2-ethylhexyl) 4,5-epoxyhexahydrophthalate and other plasticizing stabilizers of this invention perform at least equally well in similar heat and light tests. Copolymers of vinyl chloride and vinyl acetate are effectively plasticized and stabilized with the incorporation of this new modifier.

Formulations A and B, with amounts of the new epoxy esters varying from 25% to 70%, are prepared with other compounds of this invention, such as: dihexyl 4,5-epoxy-4-methylhexahydrophthalate, di(2-ethylhexyl) 4,5-epoxy-3,6-dimethylhexahydrophthalate, and di(2-ethylhexyl) 4,5-epoxy-3-chlorohexahydrophthalate. Heat and light stability essentially as good as that obtained with compositions of di(2-ethylhexyl) 4,5-epoxyhexahydrophthalate are obtained.

Various formulations with di(2-ethylhexyl) 4,5-epoxyhexahydrophthalate show an all-around performance substantially equal or superior to that of conventionally modified compositions. The new plastic products show low brittle point and low activated-carbon volatility, and are resistant to gasoline extraction to an extent substantially the same as or superior to DOP-modified compositions.

Octyl decyl epoxyhexahydrophthalate is incorporated according to formulations A and B. The plasticizing stabilizer has very good compatibility in the vinyl halide compositions. Plasticizing stabilizer stains are negligible. Upon prolonged window exposure no appreciable tack, spew, or stiffening developed. Resistance to ultraviolet light degradation is excellent. The vinyl products show a marked stability improvement over conventional compositions upon prolonged exposure to heat.

Similarly, improved vinyl compositions are obtained from decyl octyl 4,5-epoxyhexahydrophthalate, decyl octyl 4,5-epoxy-4-methylhexahydrophthalate and decyl (5-ethylhexyl) 4,5-epoxy-4-methylhexahydrophthalate.

EXAMPLE B

Di(8-methylnonyl) 4,5-epoxyhexahydrophthalate is incorporated according to formulation B. The stabilized samples show no discoloration under exposure to heat for over 5 hours at 350° F., and for at least 4 hours at 400° F. DOP compositions fail at 350° F. after 2 hours, and at 400° F. after ½ hour. The stabilized plastic composition compares very favorably with a composition plasticized by octyl decyl phthalate in the window-stability test. There are no cracks, spew, stiffening, discoloration, or embrittlement in the improved sample until after 900 hours of exposure in the fadeometer. The conventionally plasticized material fails in 468 hours. Di(8-methylnonyl) 4,5-epoxyhexahydrophthalate is a particularly exceptional stabilizing plasticizer since it imparts a very desirable balance of favorable attributes to the plastic composition.

Dodecyl tetradecyl 4,5-epoxyhexahydrophthalate similarly is a superior stabilizer of plastic compositions. Samples improved and stabilized with this new compound, in various formulations, such as for instance formulation B, are heat stable for at least 5 hours at 350° F., and about 5 hours at 400° F. Window-light stability is good and stability to cracking under fadeometer test is excellent—1,145 hours—when compared to samples conventionally modified as with octyl decyl phthalate which fail in 468 hours.

Other stabilizers-plasticizers of this invention show at least similarly superior performance in various formulations of halogen-containing vinyl resins. For instance: dodecyl tetradecyl 4,5-epoxy-3-methylhexahydrophthalate, dodecyl tetradecyl 4,5-epoxy-3,6-dimethylhexahydrophthalate, dodecyl tetradecyl 4,5-epoxy-3-chlorohexahydrophthalate, di(2-methyltetradecyl) 4,5-epoxyhexahydrophthalate, and similar others yield plastic compositions improved to substantially the same extent. Any of the polymers and copolymers of a vinyl halide of the category described above may be employed with at least equal satisfaction.

EXAMPLE C

Tetradecyl hexadecyl 4,5-epoxyhexahydrophthalate is used as stabilizer (2 parts) for Geon 101 (60 parts), the principal plasticizer being DOP (38 parts); 1 part of Tribase is also included. This material is compared with a formulation in which 40 parts of DOP are used without the epoxyhexahydrophthalate. The former stock shows an advantage of stability in the fadeometer test and in heat stability. Similar improvements can be obtained with compounds such as tetradecyl hexadecyl 4,5-epoxy-3-methylhexahydrophthalate, tetradecyl hexadecyl 4,5-epoxyhexahydrophthalate, dioctadecyl 4,5-epoxy-4-methylhexahydrophthalate, and the like. Proportions in the formulation may be increased as desired but, for better compatibility, it is recommended preferably not to exceed 5% based on the weight of the plastic material.

EXAMPLE D

Didecyl 4,5-epoxy-3,6-endo-methylenehexahydrophthalate is incorporated in a plastic composition according to formulation B. The resulting samples are compared with samples modified with DOP and octyl decyl phthalate.

The new stabilized composition is heat-stable at 350° F. for over 5 hours and at 400° F. for about 3 hours. Conventional compositions are heat-stable at 350° F. for only 2 hours, and at 400° F. only for ½ hour. In window-exposure tests, no tack, spew, or stiffening is discerned after 182 days. This is at least equal to performance of the better conventional plasticizers.

This class of endo compounds moreover exhibits a somewhat unusual combination of low soapy water and detergent extraction and comparatively low percentage loss on gasoline extraction. This unreactiveness complemented by a low volatility (A.C. volatility percent 3.5, compared with DOP 8.0) and general satisfactory all-around performance makes this class of compounds one of special interest.

When dihexyl 4,5-epoxy-4,7''-dimethyl-3,6-endomethylenehexahydrophthalate, di(8-methylnonyl) 4,5-epoxy-4-methyl-3,6-endomethylenehexahydrophthalate, di(8-methylnonyl) 4,5-epoxy-4,8''-dimethyl-3,6-endoethylenehexahydrophthalate, di(8-methylnonyl) 4,5-epoxy-4,5-dimethyl-3,6-endomethylenehexahydrophthalate, and similar other ones are used in vinyl composition equally satisfactory improvements are achieved.

Didecyl 4,5-epoxy-4-methylhexahydrophthalate is employed to stabilize and plasticize compositions according to formulation B. Heat stability extends to over 5 hours at 375° F. and to 1½ hours at 400° F. Conventionally modified compositions fail as shown in the examples above. The new compositions show very desirable low volatility: 1.6%; compared to DOP: 8.0% and 2.9% for octyl decyl phthalate. This constancy of concentration of plasticizer-stabilizer in a plasticized polymer composition imparts marked resistance to detrimental changes of the physical characteristics upon aging or heating.

In other respects the didecyl 4,5-epoxy-4-methylhexahydrophthalate stabilized compositions perform in a most satisfying manner. Other new stabilized halogen-containing resinous compositions prepared from 4,5-epoxy-4-methylhexahydrophthalates and 4,5-epoxy-4,5-dimethylhexahydrophthalates having alkyl groups $R^7$ and $R^8$ of various lengths show good performance. Plasticized polymer compositions can be stabilized with products of this invention having the somewhat unusual combination of an epoxy group, methylenic or ethylenic bridge, and even only one methyl substituent on the carbons vicinal to the epoxy oxygen. In this manner there may be prepared new compositions combining to a very desirable extent very low volatility, good stability to soapy water, and gasoline extraction and at the same time having outstanding heat and window stability as well as resistance to degradation by ultraviolet light. In a similar fashion there may be selected from the compounds of this invention one which exhibits to an exceptional degree the properties desired in the final stabilized-plasticized polymer composition; alternatively there may be prepared blends of such compounds in various concentrations to yield new plastic compositions of exceptional qualities.

The new polymeric halogen-containing vinyl compositions excel as general purpose film, upholstery sheeting, coated fabric, insulation resistant to high temperatures, out-door and aquatic accessories, hospital sheeting, flooring, wall-covering, and the like.

We claim:

1. A new composition of matter of the formula

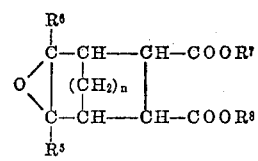

in which $R^5$ and $R^6$ are selected from the group consisting of hydrogen atoms, lower alkyl radicals of one to four carbon atoms and chlorine, $R^7$ and $R^8$ are alkyl radicals of six to eighteen carbon atoms, and $n$ is an integer having a value of 1 to 2 inclusive.

2. A new composition of matter of the formula

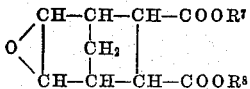

in which $R^7$ and $R^8$ are alkyl radicals of six to eighteen carbon atoms.

3. Dioctyl 4,5 - epoxy - 3,6-endomethylenehexahydrophthalate.

4. Dihexyl 4,5 - epoxy - 3,6 - endomethylenehexahydrophthalate.

5. Didecyl 4,5-epoxy - 4 - methyl - 3,6-endomethylene-4-methylhexahydrophthalate.

6. Didecyl 4,5 - epoxy - 3,6 - endomethylenehexahydrophthalate.

7. Di(2 - ethylhexyl) 4,5 - epoxy-3,6-endomethylene-4-methylhexahydrophthalate.

References Cited in the file of this patent

UNITED STATES PATENTS

| | | |
|---|---|---|
| 2,311,259 | Staff et al. | Feb. 16, 1943 |
| 2,311,261 | Staff | Feb. 16, 1943 |
| 2,761,870 | Payne et al. | Sept. 4, 1956 |
| 2,768,148 | Schildknecht et al. | Oct. 23, 1956 |
| 2,787,605 | Hook et al. | Apr. 2, 1957 |
| 2,794,030 | Phillips et al. | May 28, 1957 |
| 2,801,253 | Greenspan et al. | July 30, 1957 |
| 2,813,878 | Wahlroos | Nov. 19, 1957 |

FOREIGN PATENTS

| | | |
|---|---|---|
| 1,135,940 | France | May 6, 1957 |

OTHER REFERENCES

Alder, Justus Liebigs Annalen der Chemie, vol. 514 (1934), p. 5.

Alder, Justus Liebigs Annalen der Chemie, vol. 524 (1936), p. 197.

Notice of Adverse Decision in Interference

In Interference No. 92,970 involving Patent No. 2,963,490, S. P. Rowland and E. M. Beavers, EPOXYHEXAHYDROPHTHALATES AND ENDO-ALKYLENE-EPOXYHEXAHYDROPHTHALATES, final judgment adverse to the patentees was rendered Mar. 18, 1966, as to claims 2, 3, 4 and 6.
[*Official Gazette May 17, 1966.*]